(12) United States Patent
Harvey

(10) Patent No.: US 6,325,335 B1
(45) Date of Patent: Dec. 4, 2001

(54) FRONT ACCESS CLIP

(75) Inventor: J. D. Harvey, Trophy CLub, TX (US)

(73) Assignee: CCS Holdings, Inc., Hickory, NC (US)

( * ) Notice: Subject to any disclaimer, the term of this patent is extended or adjusted under 35 U.S.C. 154(b) by 521 days.

(21) Appl. No.: 08/772,198

(22) Filed: Dec. 20, 1996

(51) Int. Cl.$^7$ .................................................. G12B 9/00
(52) U.S. Cl. .......................................... 248/27.1; 248/27.3
(58) Field of Search ................................. 248/27.1, 27.3, 248/56, 222.11, 222.12, 231.9

(56) References Cited

U.S. PATENT DOCUMENTS

| | | | |
|---|---|---|---|
| 3,248,078 | * 4/1966 | Ast | 248/27.3 |
| 3,446,467 | * 5/1969 | Bailey et al. | 248/27.1 |
| 3,706,869 | * 12/1972 | Sorenson | 200/295 |
| 4,406,936 | * 9/1983 | Ohashi | 200/296 |
| 4,707,765 | * 11/1987 | Ohashi | 248/27.3 |
| 5,200,884 | * 4/1993 | Ohashi | 361/761 |
| 5,214,735 | * 5/1993 | Henneberger et al. | 385/136 |
| 5,217,190 | * 6/1993 | Reed et al. | 248/56 |
| 5,238,426 | * 8/1993 | Arnett | 248/27.3 |

* cited by examiner

*Primary Examiner*—Anita King

(57) ABSTRACT

A clip (10) is disclosed for mounting a optical fiber coupler (12) in a panel (14) of a device such as a horizontal coupler module (16). The clip (10) is formed of resilient spring steel and has first and second tabs (90, 100) with a portion (92, 102) extending away from the sides (86, 88) of the clip and a second portion (96, 106) which extends toward the sides. The clip (10) allows the clip and coupler (12) to be inserted from the front side (68) of the panel (14) and removed from the front side for inspection, testing and cleaning.

13 Claims, 7 Drawing Sheets

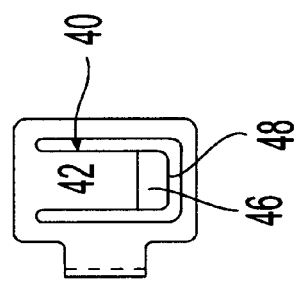
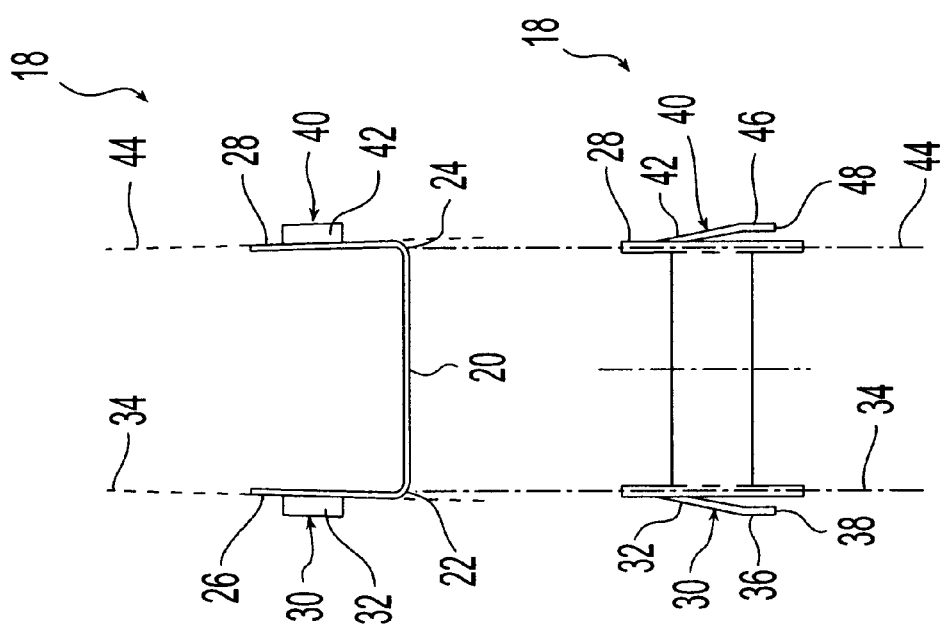
Fig. 2 (Prior Art)
Fig. 3 (Prior Art)
Fig. 4 (Prior Art)

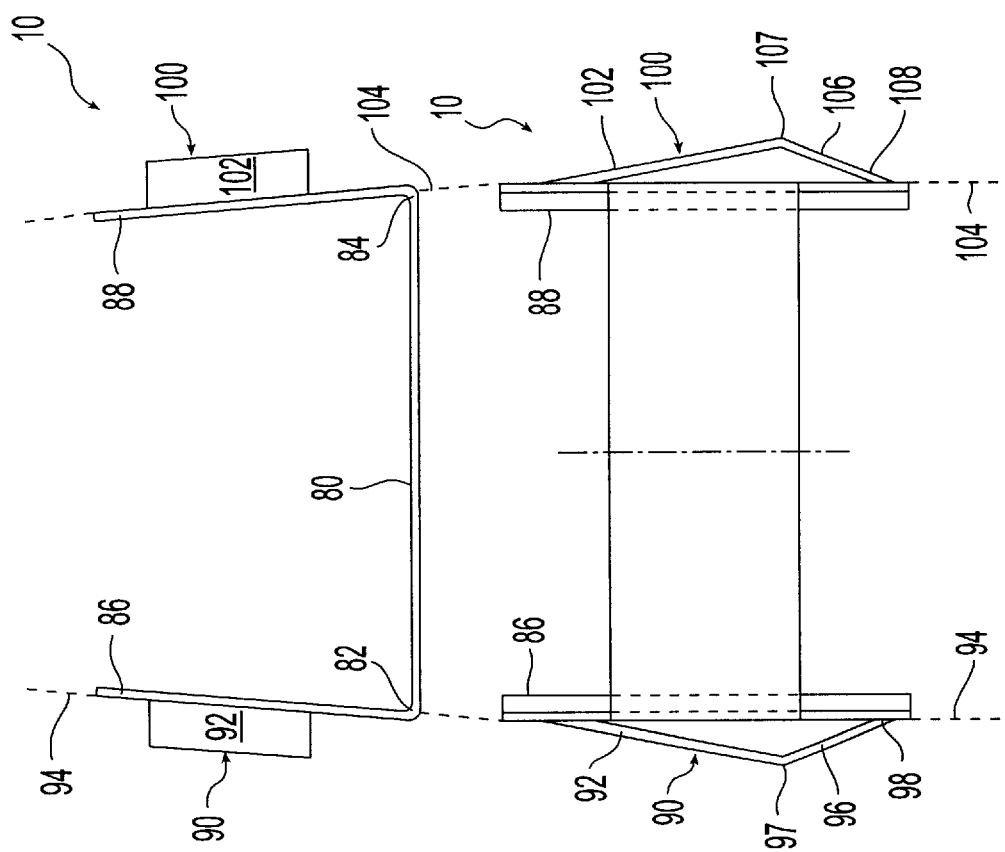

FRONT ACCESS CLIP

TECHNICAL FIELD OF THE INVENTION

This invention relates to optical fiber communication, and in particular to a clip for an optical cable connector.

BACKGROUND OF THE INVENTION

The use of fiber optic cables for communication is growing rapidly. The particular requirements of fiber optic cables requires special designs for connectors to connect ends of cables together and specially designed termination boxes to, among other things, insure the minimum curvature radius of the fiber optic cable is not exceeded.

With fiber optic connectors, the need to clean, inspect and test is a common activity in the field. The connectors are commonly mounted on a panel or housing and connect two fiber optic cables together. While the front part of the connector is readily accessible outside of the panel or housing to test the fiber optic cable entering the front, the fiber optic cable entering the rear portion of the connector is often within the panel or housing and inspection and testing is more difficult.

In response to the wishes of customers to obtain easier access to the rear portion of the connector after installation in the panel or housing, Siecor has, in certain cases, utilized a mounting plate with very small screws for removably mounting the plate, clip and SC coupler in the panel or housing. This increases the cost of assembly and is less desirable to the customer because of the necessity of removing the screws and replacing the screws during the inspection. A need therefore exists for a technique to provide improved access to the rear portion of the connector which is inexpensive to manufacture and easy and reliable to use in the field.

U.S. Pat. No. 5,214,735 discloses a separate retainer that can be removed from a frame. This retainer requires that the frame or panels be specially constructed to accommodate the retainer thus preventing retrofitting of existing connector/frame designs. Additionally, the retainer requires too much space thus sacrificing density of connectors. Additionally, the retainer requires simultaneous "squeezing" of the retainer while pulling which can be difficult to do given the small size of the retainer and limited access.

SUMMARY OF THE INVENTION

In accordance with one aspect of the present invention, a clip is provided for securing a coupler to a support with the support having an aperture defining opposed edges. The clip is retrofittable to existing coupler/support arrangements and allows push-pull insertion/removal of the coupler from the support. The clip includes a back having first and second ends, a first side extending from the first end of the back and a second side extending from the second end of the back. A first tab extends at one end thereof from said first side with the first tab having a first portion extending away from the first side when exposed to no external force and a second portion extending toward the first side when exposed to new external force. The clip further has a second tab which extends at an end thereof from said second side and has a first portion extending away from the second side when exposed to no external force and second portion extending toward the second side when exposed to no external force.

The clip is mounted on the coupler and the clip and coupler are inserted into the support from the front thereof. The first and second tabs resiliently hold the clip and coupler to the support, but permit the clip and coupler to be removed from the support from the front of the support by sufficiently deflecting the first and second tabs.

BRIEF DESCRIPTION OF TEE DRAWINGS

A more complete understanding of the invention and its advantages will be apparent from the following detailed description when taken in conjunction with the accompanying drawings, in which:

FIG. 2 is a plan view of a prior art clip;

FIG. 3 is a front view of the prior art clip;

FIG. 4 is an side view of the prior art clip;

FIG. 5 is a plan view of a clip forming a first embodiment of the present invention;

FIG. 6 is a front view of the clip of FIG. 5;

FIG. 7 is a side view of the clip of FIG. 5;

DETAILED DESCRIPTION

Figure 1:
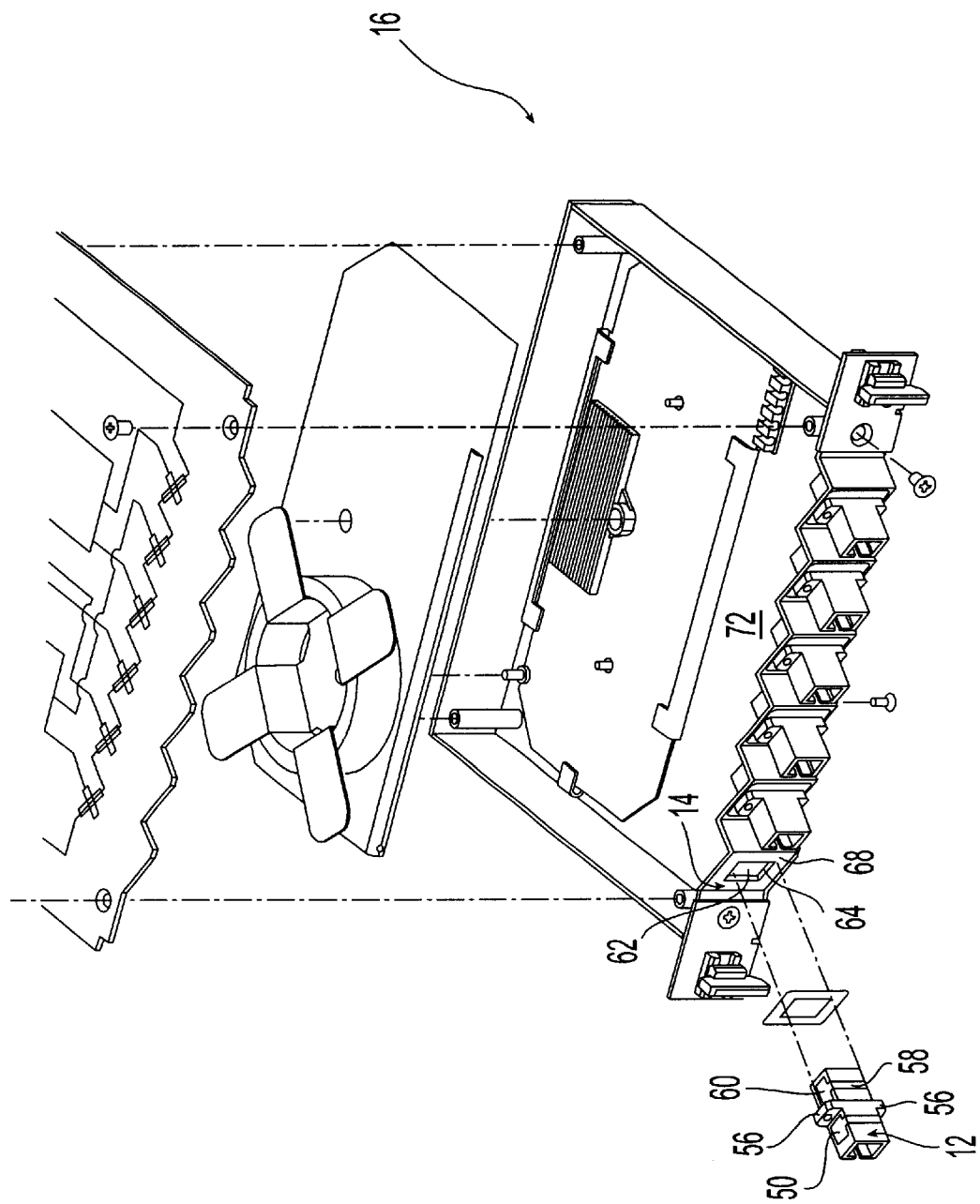
FIG. 1 is a perspective view of a horizontal coupler module in which the clip of the present invention can be used.

Referring now to the drawings, wherein like reference characters designate like or corresponding parts through the several views, and in particular to FIGS. 5–7, there is shown an improved clip 10 forming a first embodiment of the present invention. Clip 10 is employed to attach a fiber optic coupler 12 to a panel 14 mounted on a device, such as horizontal coupling module 16, shown in FIG. 1. As will be described in greater detail hereinafter, the design of the clip 10 permits the coupler 12 to be removed from the panel 14 on the same side of the panel from which it was installed. This permits the rear of the coupler to be inspected.

With reference to FIGS. 2–4, the prior art clip 18 will be described. The clip 18 is formed of spring steel, such as 304 stainless steel. The clip is unitary and includes a back 20 having a first end 22 and a second end 24. A first side 26 extends from the first end 22 of back 20, generally perpendicular the elongate dimension of the back 20. A second side 28 extends from the second end 24 of the back 20 in a direction also generally perpendicular the elongate extent of the back 20. As can best be seen in FIG. 2, when exposed to no external force, the first and second sides 26 and 28 are shaped to slightly converge toward each other away from the back 20 to provide a resilient spring attachment to the coupler 12, as will be discussed hereinafter.

A first tab 30 extends from the first side 26 in a cantilevered manner and has a first portion 32 which extends generally away from the plane 34 of the first side 26 when exposed to no external force and a second portion 36 which extends generally parallel the plane 34 up to the end 38 of the first tab. Similarly, a second tab 40 extends from the second side 28 and has a first portion 42 which extends at an angle away from the plane 44 containing the second side when exposed to no external force and a second portion 46 extending generally parallel the plane 44 when exposed to no external force, extending up to the end 48 of the second tab.

With reference now to FIGS. 1, 8, 8A and 8B, the clip 18 can be secured on a coupler 12. The couplers 12 include a plastic housing 50 which has a front portion 52 and rear portion 54 that are symmetrical on either side of arms 56 which extend outwardly from the housing 50. Coupler 12 can, for example, be an SC coupler sold by Siecor Corporation of Hickory, North Carolina. The SC coupler is used to couple a pair of fiber optic cables, usually about 125 $\mu$m (0.005 inches) in diameter which are terminated in ferrules having a diameter of about 2.5 mm. A split sleeve, usually of ceramic or Beryllium copper, is mounted in the coupler to receive the termination ferrules of the mating fibers and frictionally secure the ferrules within the sleeve with the fiber optic cables in precise alignment. One fiber optic cable and its associated ferrule is inserted into the coupler from the front portion 52 while the mating fiber optic cable and its associated ferrule is inserted into the couple from the rear portion 54.

Figure 8:
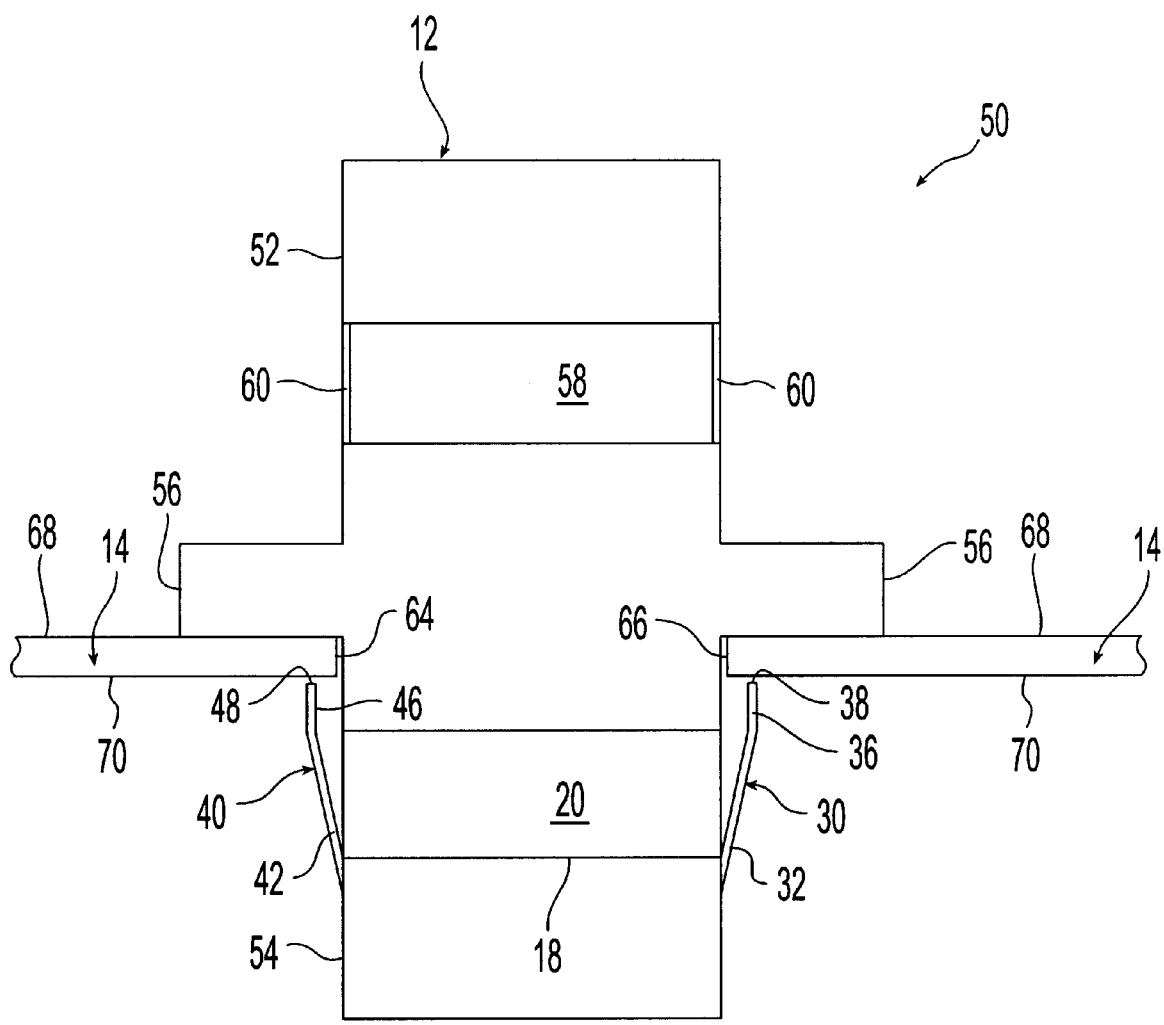
FIG. 8 is a plan view of the prior art clip installed.
Figure 8A:
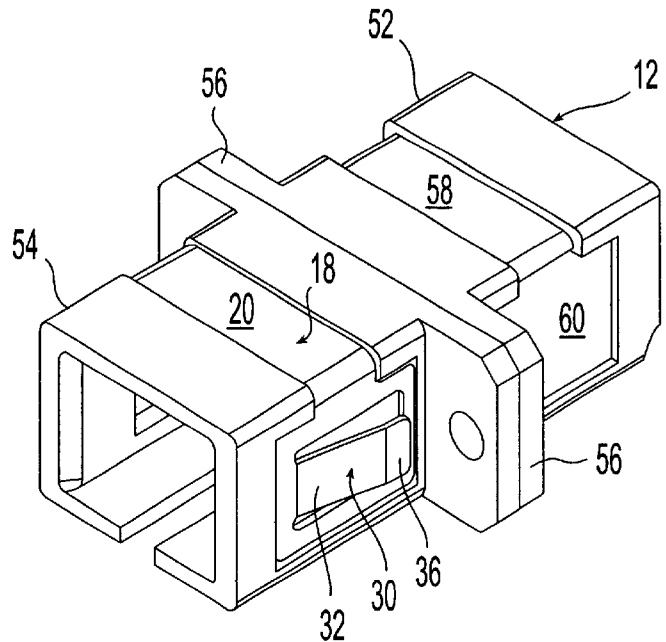
FIG. 8A is a perspective view of the prior art clip mounted on the coupler.
Figure 8B:
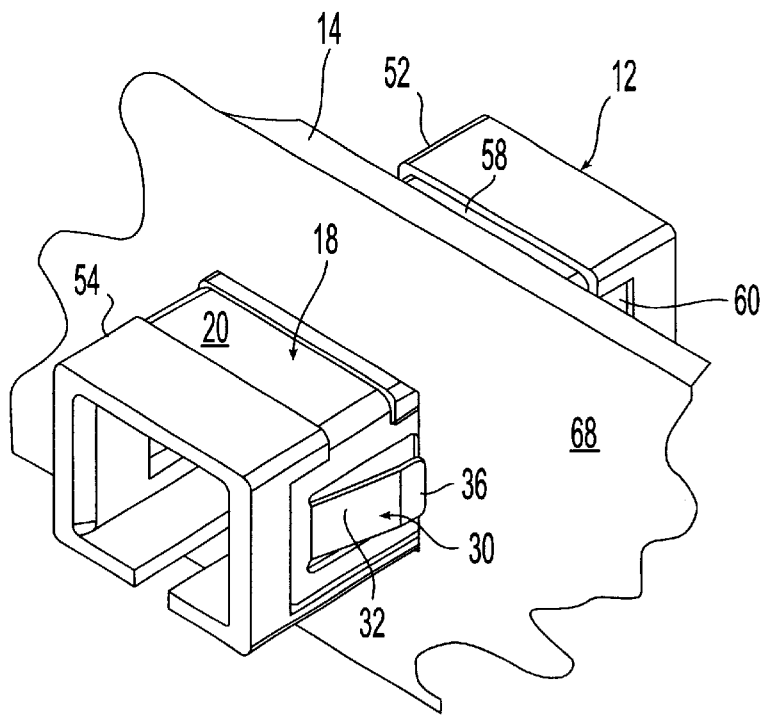
FIG. 8B is a perspective view of the prior art clip and coupler installed in a panel.
Figure 9:
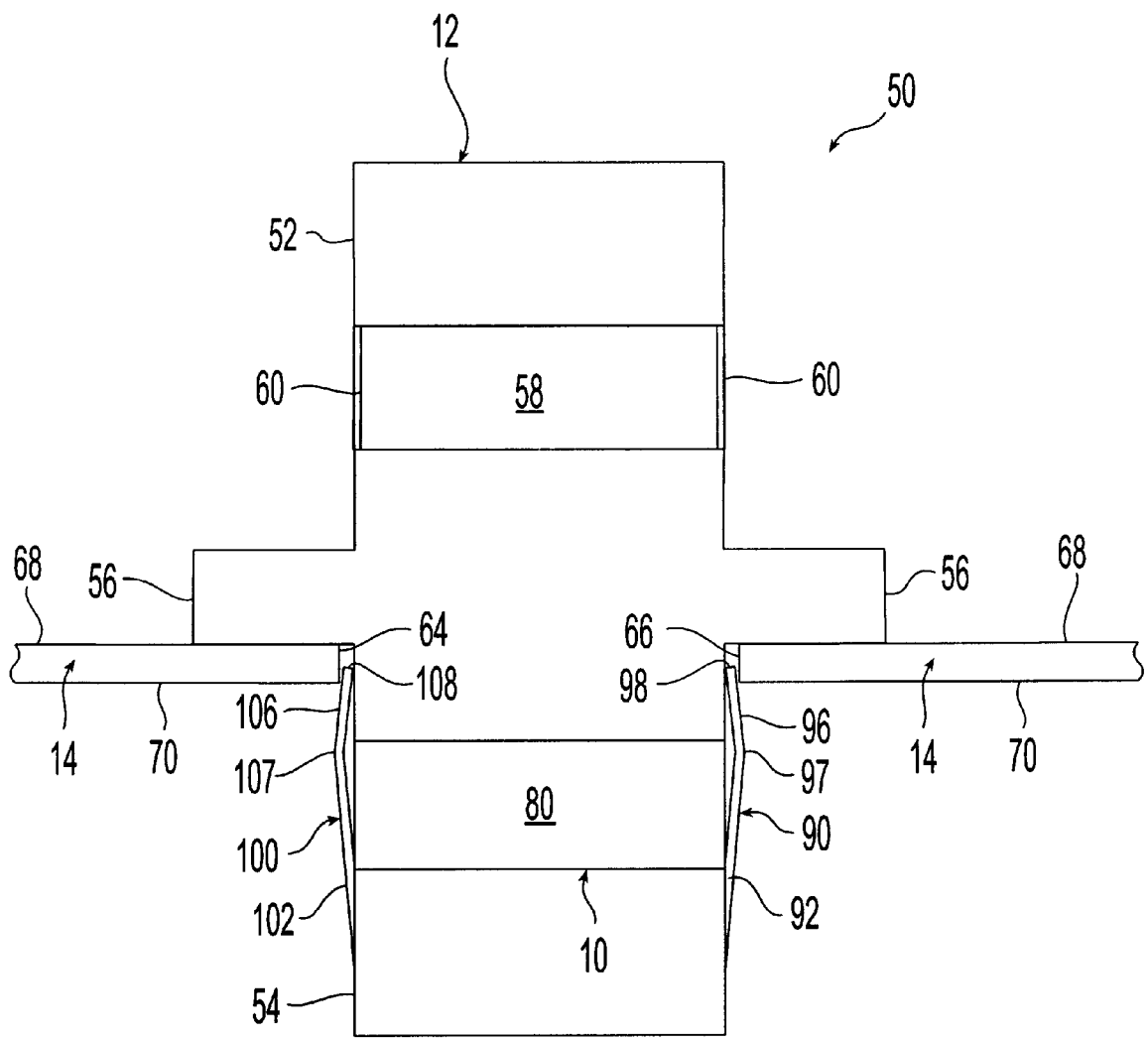
FIG. 9 is a plan view of the clip of FIG. 5 installed.

The clip 18 is mounted on the rear portion 54 of the coupler with the coupler 12 preferably having recessed portion 58 in housing 50 to receive the back 20 of the clip and recessed portions 60 in the housing 50 to receive the first and second sides 26 and 28. The clip 18 is oriented on the coupler 12, as best seen in FIG. 8, with the ends 38 and 48 of the tabs 30 and 40 facing the arms 56.

As can be readily understood, the coupler 12, and clip 18 as secured thereon, can be inserted through an aperture 62 in panel 14. The aperture 62 is shown as rectangular having opposed edges 64 and 66. As the coupler and clip are inserted into the aperture 62 from the front side 68 of the panel 14, as seen in FIG. 1, the first and second tabs 30 and 40 are resiliently pushed inwardly toward the coupler to allow the tabs to pass between opposed edges 64 and 66. As the ends 38 and 48 come free of the edges 64 and 66, the first and second tabs 30 and 40 spring outwardly, causing the ends 38 and 48 to face the back side 70 of the panel 14 and thus prevent the clip 18 and coupler 12 from being removed from the panel from the front side 68 thereof. As can be understood, to remove the coupler 12 and clip 18 from the panel 14, access would be necessary to the interior 72 of the module 16 or such other device on which the panel 14 is mounted, to allow manual compression of the first and second tabs 30 and 40 to allow the ends 38 and 48 to clear the opposed edges 64 and 66 of the panel.

Figure 10:
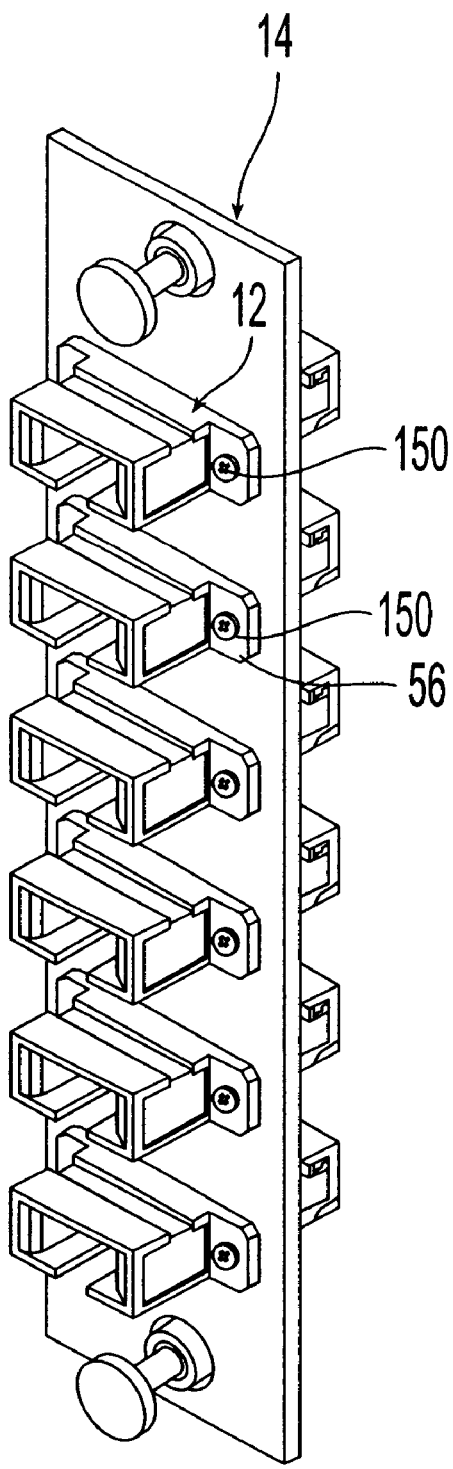
FIG. 10 is a perspective view of prior art screw mounted couplers.

Another prior art technique for mounting couplers 12 on panel 14 is seen in FIG. 10. In this technique, the couplers 12 are simply screwed to the panel by screws 150. While access to the rear portion of the connector is possible by unscrewing screws 150, the operation is time consuming and inefficient. The screws 150 used must be quite small and are easily lost. Screws do no allow for a simple push-pull insertion and removal of the coupler. Moreover, screws are not easily retrofitted on existing coupler/support arrangements.

With reference now to FIGS. 5–7 and 9, the improved clip 10 of the present invention will be described. As seen in FIGS. 5–7, the clip is formed of an integral piece formed of spring steel, such as 304 stainless steel. The clip 10 includes a back 80 which has a first end 82 and a second end 84. A first side 86 extends from the back at the first end 82 generally perpendicular to the elongate length of the back 80, a second side 88 extends from the back at the second end 84 also generally perpendicular to the elongate length of the back 80. As with clip 18, the first and second sides 86 and 88 generally extend from the back 80 in a slightly converging direction to provide resilient spring force to hold the clip 10 on the coupler 12.

A first tab 90 extends from the first side 86 and includes a first portion 92 which extends generally outwardly from a plane 94 containing the first side and a second portion 96 which extends generally toward the plane 94 when not exposed to an external force, up to the end 98 of the first tab. The point at which second portion 96 begins extending back toward plane 94 defines apex 97 of first tab 90. Similarly, a second tab 100 extends from the second side 88 and has a first portion 102 which extends generally away from the plane 104 containing the second side 88 and a second portion 106 which extends generally toward the plane 104 to the end 108 of the second tab. The point at which second portion 106 begins extending back toward plane 104 defines apex 107 of second tab 100. As can be appreciated, the clip 10 is mounted on the coupler 12 in a similar manner to the clip 18. The clip 10 and coupler 12 can then be mounted in the panel 14 from the front side 68 thereof. The first and second tabs 90 and 100 resiliently flatten as apexes 97 and 107 deflect inward as they pass the opposed edges 64 and 66 of the aperture 62. Once apexes 97 and 107 pass edges 64 and 66, they begin moving outward. At the point of full insertion where the arms 56 move into contact with the front side 68 of the panel 14, the ends 98 and 108 do not clear the edges 64 and 66. Additionally, apexes 97 and 107 are disposed outside of edges 64 and 66, thus, the coupler 12 is held in the panel 14 by the clip 10 by the resiliency of the first and second tabs 90 and 100 at all times. In contrast, the tabs of clip 18, after the ends 38 and 48 clear the edges 64 and 66, generally spring outward to their normal configuration in the absence of external forces. The first and second tabs 90 and 100 are designed to provide sufficient resilient force to hold the coupler 12 in place within the panel 14 so that a fiber optic cable coupled to the coupler 12 on the front side 68 of the panel can be removed and installed without the coupler 12 being released from the panel 14. However, when the coupler 12 is to be removed from the panel 14 from the front side 68 of the panel for cleaning, testing and inspection, sufficient pulling force on the coupler need only be applied to flatten the first and second tabs 90 and 100 to deflect apexes 97 and 107 inward to pull the coupler 12 and clip 10 from the panel 14.

While the clip 10 is shown as a discrete member from the coupler 12, it can be readily understood that the clip and coupler can be made in an integrated manner.

Although a single embodiment of the present invention has been illustrated in the accompanying drawings and described in the foregoing detailed description, it will be understood that the invention is not limited to the embodiment disclosed, but is capable of numerous rearrangements, modifications, and substitutions of parts and elements without departing from the scope and spirit of the invention.

What is claimed is:

1. A coupler and panel assembly, comprising:

(a) a generally planar panel having a front side and a back side, the panel defining an aperture therethrough, the aperture having an edge surface perpendicular to the front and back sides;

(b) a coupler disposed through the aperture, the coupler defining a longitudinal direction that is perpendicular to the panel, the coupler having a first arm and a second arm extending laterally therefrom, the first arm and the second arm disposed against the front side of the panel;

(c) a clip mounted to the coupler adjacent the back side of the panel, the clip having a first tab extending from the clip and terminating at a first tab end, the first tab having a first portion that extends away from the coupler and toward the back side of the panel to an apex, the apex spaced in the longitudinal direction from the back side of the panel and laterally outward of the edge surface of the aperture, the first tab having a second portion that extends from the apex toward the coupler and toward the back side of the panel and terminating at the first tab end, the first tab end disposed at a point between the coupler and the edge surface of the aperture, the first tab sufficiently flexible such that pulling of the coupler from the front side of the panel will cause the apex to flatten to a point where it can pass through the aperture.

2. The assembly of claim 1 wherein the first tab end terminates at a point between the front side and the back side of the panel.

3. The assembly of claim 1 further comprising a second tab extending from the clip and terminating at a second tab end, the second tab having a first portion that extends away from the coupler and toward the back side of the panel to an apex, the apex spaced in the longitudinal direction from the back side of the panel and laterally outward of the edge surface of the aperture, the second tab having a second portion that extends from the apex toward the coupler and toward the back side of the panel and terminating at the second tab end, the second tab end disposed at a point between the coupler and the edge surface of the aperture, the second tab sufficiently flexible such that pulling of the coupler from the front side of the panel will cause the apex to flatten to a point where it can pass through the aperture.

4. A fiber optic coupler and clip assembly for inserting into an opening in a panel comprising:

a coupler having a front portion, a back portion, and two arms extending laterally from the coupler; and a clip member mounted on the back portion of the coupler, the clip having a first tab, the first tab having a first portion extending toward the front portion of the coupler at an outward angle relative to the coupler and terminating at an apex, the apex spaced outward from the coupler to extend beyond the opening in the panel, the first tab having a second portion extending from the apex back toward the coupler and terminating at a first tab end, the first tab end disposed adjacent the coupler.

5. The assembly of claim 4, the clip member having a second tab on an opposite side of the coupler from the first tab, the second tab having a first portion extending toward the front portion at an outward angle relative to the coupler and terminating at an apex, the apex spaced outward from the coupler to extend beyond the opening of the panel, the second tab having a second portion extending from the apex back toward the coupler and terminating at a second tab end, the second tab end disposed adjacent the coupler.

6. The assembly of claim 4, wherein the clip member is removably mounted on the coupler.

7. The assembly of claim 4, wherein the clip member is mounted on the coupler such that when the coupler is inserted into the panel, the first tab end terminates in the opening of the panel between an edge of the panel and the coupler.

8. The assembly of claim 4, wherein the clip member is mounted on the coupler with the first tab end adjacent one of the two laterally extending arms.

9. The assembly of claim 4, wherein an outside surface of the second portion of the first tab is an engaging surface to engage the panel.

10. The assembly of claim 4, wherein the clip member is made of a resilient material.

11. The assembly of claim 4, wherein the first tab member flexes inward toward the coupler as the assembly is inserted through the panel opening and the first tab member engages the panel opening to secure the assembly in the opening.

12. The assembly of claim 4, wherein the clip member further comprising:

an elongated back member having two ends; and first and second side members extending from a respective end of the elongated back member in a substantially perpendicular direction, the first tab disposed on the first side member.

13. The assembly of claim 12, the first side member having two elongated side portions extending from an end of the side member toward the elongated back member, the first tab disposed between the two side portions.

* * * * *